(12) United States Patent
Zhou et al.

(10) Patent No.: US 7,706,263 B2
(45) Date of Patent: Apr. 27, 2010

(54) TRACKING AND BLOCKING OF SPAM DIRECTED TO CLIPPING SERVICES

(75) Inventors: Min Zhou, Palo Alto, CA (US); Zhaowei Charlie Jiang, San Jose, CA (US); Michael Jeremy Temkin, San Francisco, CA (US); Daniel John Woods, Santa Cruz, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1026 days.

(21) Appl. No.: 11/303,318

(22) Filed: Dec. 15, 2005

(65) Prior Publication Data

US 2007/0140117 A1 Jun. 21, 2007

(51) Int. Cl.
*H04L 12/26* (2006.01)
(52) U.S. Cl. ........................................ 370/230; 370/235
(58) Field of Classification Search ........................ None
See application file for complete search history.

(56) References Cited

U.S. PATENT DOCUMENTS 7,295,833 B2 * 11/2007 Agrawal et al. .......... 455/414.3
7,373,385 B2 * 5/2008 Prakash ....................... 709/206
2004/0199597 A1 * 10/2004 Libbey et al. ............... 709/207

* cited by examiner

*Primary Examiner*—Frank Duong
(74) *Attorney, Agent, or Firm*—Darby & Darby P.C.; Jamie L. Wiegand

(57) ABSTRACT

A method and apparatus tracks and blocks content requested by a first remote device for forwarding over a network to a second remote device. For a given content item, one or more usage identities are tracked. Usage identities may include any combination of one or more of a source identity, a content identity, and/or a destination identity. One or more thresholds associated with the tracked usage identities are applied to determine whether a request to forward content should be blocked; a threshold is a limit on the number of times a content item having a particular usage identity may be forwarded within a time period. Misuse of content-forwarding messaging services by spammers and the like may thereby be discouraged. In one embodiment, the invention may be employed as part of a content clipping service for forwarding content to mobile devices by way of SMS or another mobile messaging technology.

24 Claims, 7 Drawing Sheets

TRACKING AND BLOCKING OF SPAM DIRECTED TO CLIPPING SERVICES

FIELD OF THE INVENTION

The present invention relates generally to managing communication of content over a network, and more particularly, but not exclusively, to an apparatus and method for tracking and blocking content sent by way of a clipping service to remote devices, such as mobile devices, to prevent and discourage spam.

BACKGROUND OF THE INVENTION

The problem of spam in established communication technologies, such as electronic mail, is well-recognized. Spam may include unsolicited messages sent by a computer user over a network to a large number of recipients, sometimes including attached files or hyperlinks. Spam includes unsolicited commercial messages, but spam has come to be understood more broadly to additionally include unsolicited messages sent to a large number of recipients, and/or to a targeted user or targeted domain, for malicious, disruptive, or abusive purposes, regardless of commercial content. For example, a spammer might send messages in bulk to a particular domain to exhaust its resources.

Spam has more recently emerged as a problem afflicting other means of communicating over networks, such as messaging technologies for mobile devices and instant messaging (IM) systems. Spam may be especially harmful to providers and users of these messaging technologies, which are often characterized by immediacy and/or reduced bandwidth. Moreover, with respect to mobile messaging, spam may impose a direct cost on users, who are often charged for each message, such as a Short Message Service (SMS) text message, received by a mobile telephone or other mobile device.

Clipping services provide a mechanism by which a messaging technology, such as SMS, IM, or the like, may be employed to enable a user at one remote device to provide a selected clip of content to another remote device. If the clipping service is made generally available to network users, however, it is at risk of being exploited by spammers. Thus, it is with respect to these considerations, and others, that the present invention has been made.

BRIEF DESCRIPTION OF THE DRAWINGS

Non-limiting and non-exhaustive embodiments of the invention are described with reference to the following drawings. In the drawings, like reference numerals refer to like parts throughout the various figures unless otherwise specified.

For a better understanding of the invention, reference will be made to the following Detailed Description of the Invention, which is to be read in association with the accompanying drawings, wherein.

DETAILED DESCRIPTION OF THE INVENTION

Figure 1:
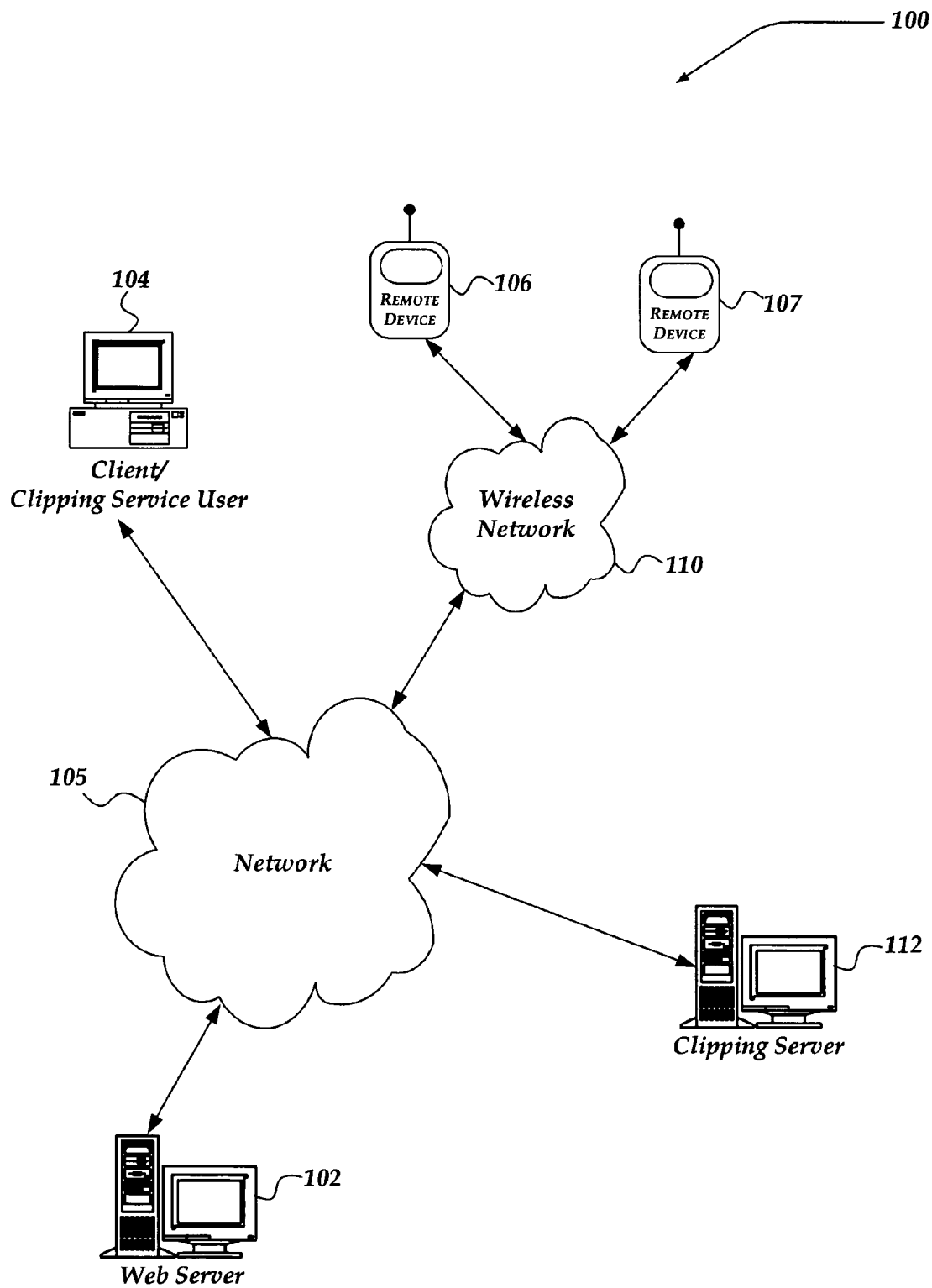
FIG. 1 shows a functional block diagram illustrating one embodiment of an environment for practicing the invention.

The present invention will now be described more fully hereinafter with reference to the accompanying drawings, which form a part hereof, and which show, by way of illustration, specific exemplary embodiments by which the invention may be practiced. The invention may, however, be embodied in many different forms and should not be construed as limited to the embodiments set forth herein; rather, these embodiments are provided so that this disclosure will be thorough and complete and will fully convey the scope of the invention to those skilled in the art. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. The phrase "in another embodiment" as used herein does not necessarily refer to a different embodiment, although it may. The term "or" is used herein in its inclusive sense, and is equivalent to the term "and/or," unless the context clearly dictates otherwise. The term "based on" is not exclusive and allows for being based on additional factors not described, unless the context clearly dictates otherwise. In addition, throughout the specification, the meanings of "a," "an," and "the" include plural references. Plural nouns include both the singular and the plural, unless the context indicates otherwise. The meaning of "in" includes "in" and "on." The terms "comprising," "including," "containing," "having," and "characterized by" are open-ended or inclusive and do not exclude additional unrecited elements or steps.

The present invention is directed towards a method and apparatus for tracking and blocking content selected by a first remote device for forwarding over a network to a second remote device, which may be, for example, a mobile device or a nonmobile computing device. The invention may be practiced as part of, or in association with, a content clipping service, a messaging service that enables forwarding of selected content, and the like, including services that employ SMS or other messaging technologies for mobile devices, IM services for mobile and/or nonmobile devices, and the like. One example of a content clipping service is described in the co-pending and commonly-owned patent application "Method for Providing a Clip for Viewing at a Remote Device," U.S. patent application Ser. No. 10/951,982, which incorporated herein by reference.

In accordance with the invention, a request to forward a selected content item to an identified remote recipient device is received over a network from a remote requesting device. The content item may include selected content of any kind, such as content selected from a browsed web page and/or content stored at the remote requesting device, and may include, for example, images, photos, documents, news articles, audio data, video data, sports scores, weather information, driving directions, business or personal contact information, and so forth. Each of the remote requesting device and the remote recipient device may be, for example, a personal computer, a mobile device such as a mobile telephone, a handheld computer, a pager, a personal digital assistant (PDA), or another kind of device equipped for communication of data over wired and/or wireless networks.

A received request to have a selected content item provided to a remote device is associated with one or more usage identities and one or more usage identity thresholds. The usage identities may include any combination of one or more of a source identity, a content identity, and a destination identity. A source identity identifies the user or device that is requesting the forwarding of content. A content identity identifies the content itself. A destination identity identifies the recipient specified in the request.

For a given content item, a particular set of usage identities may be tracked, and a particular set of thresholds may be applied to determine whether a content forwarding request is to be blocked or allowed. In general, a threshold is a limit on the number of times a content item having a particular usage identity may be forwarded within a certain time period. In one embodiment, the requesting device selects a clip of content browsed on a web page, and the web server providing the web page and enabling the content clipping may specify the particular usage identities that are to be determined and/or the particular thresholds that are to be applied to the clipping request. In another embodiment, usage identities, and/or thresholds, are determined based on default settings or default values defined by the clipping service. Other embodiments are contemplated. Depending on the policies applicable to a given content item, if one or more thresholds are exceeded, the request to forward the content to the remote recipient is blocked. An error notification may be sent to the requesting device. If the one or more applicable thresholds are not exceeded, the content may be forwarded as requested.

The invention may be employed to identify, prevent and/or discourage usage of messaging services by spammers and other requesters who abuse these services; additionally, the invention may be employed for other purposes for which application of usage identity thresholds is useful. Spam generally takes the form of a large number of messages sent by a particular source device within a given period of time, a large number of messages having a particular content sent within a given period of time, and/or a large number of messages sent to a particular destination device within a given period of time. By applying thresholds associated with tracked usage identities, content forwarding requests that are more likely to be spam may be identified and blocked. Moreover, those who might attempt to use a content clipping service or another kind of content forwarding message service for spamming or other abusive purposes may decide not to engage in such behavior if it is likely that their efforts would be obstructed.

By applying different thresholds to different kinds of content items, web content providers and clipping services may differentiate among content items based on various factors. For example, a set of relatively low thresholds for blocking content forwarding requests may be useful, for example, for content items that raise sensitivity or security concerns. On the other hand, higher thresholds might be specified for content items that are expected to be relatively popular (such as a recent news item or sports score) and thus be associated with a large number of legitimate content forwarding requests.

Illustrative Operating Environment

FIG. 1 shows components of an exemplary environment in which the invention may be practiced. Not all the components may be required to practice the invention, and variations in the arrangement and type of the components may be made without departing from the spirit or scope of the invention. As shown, environment 100 of FIG. 1 includes clipping server 112, web server 102, network 105, wireless network 110, client device/clipping service user 104, and remote devices 106-107.

Generally, remote devices 106-107 may include virtually any computing device capable of connecting to another computing device and receiving information. Such devices include portable devices such as cellular telephones, smart phones, display pagers, radio frequency (RF) devices, infrared (IR) devices, personal digital assistants (PDAs), handheld computers, wearable computers, tablet computers, integrated devices combining one or more of the preceding devices, and the like. Remote devices 106-107 may also include other computing devices, such as personal computers, microprocessor-based or programmable consumer electronics, workstations, and the like. As such, remote devices 106-107 typically range widely in their capabilities and features. For example, a cell phone may have a numeric keypad and a few lines of monochrome LCD display for displaying text. As another example, a web-enabled remote device may have a touch-sensitive screen, a stylus, and several lines of color LCD display in which both text and graphics may be displayed. The web-enabled remote device may include a browser application enabled to receive and to send messages in accordance with a protocol such as Wireless Application Protocol (WAP), iMode, Hypertext Transfer Protocol (HTTP), and the like. In one embodiment, the browser application is enabled to employ a markup language such as Wireless Markup Language (WML) or WMLScript, and the like, to display a received message and to send a message to a remote device.

Each of remote devices 106-107 also may include at least one client application that is configured to receive content of various kinds from another computing device. The client application may include the capability to provide and receive textual content, graphical content, audio content, and the like. The client application may further provide identifying information that indicates a content format that the remote device is enabled to employ. Such information may be provided in a message, or the like, sent to clipping server 112. Although remote devices 106-107 are illustrated as devices that communicate with other devices by way of wireless network 110 and network 105, it will be appreciated that in other embodiments of the invention devices functioning similarly to remote devices 106-107 may be wired computing devices linked to network 105 rather than, or in addition to, devices that communicate wirelessly.

Each of remote devices 106-107 may be configured to receive, display, and/or send a message, such as through Short Message Service (SMS), Multimedia Message Service (MMS), instant messaging (IM), Internet Relay Chat (IRC), Jabber, Enhanced Messaging Service (EMS), text messaging, Smart Messaging, Over the Air (OTA) messaging, and the like, with another computing device, such as clipping server 112. The message may itself include an item of content, such as a text message, a bitmap image, a photo, an audio file, movie, graphic, or the like. The message may also include a URL, a script that provides or includes a URL, and the like. Each of remote devices 106-107 may be configured to employ the URL, or the like, to request access to another message or content item from clipping server 112 or another remote computing device. The other message or content item may include, for example, an email message, a document, an audio file, a video file, a compressed file, movie, graphic, or the like.

Client device 104 may include virtually any computing device capable of sending and receiving a message over a network, such as network 105, and the like, to and from another computing device, such as clipping server 112, web server 102, and the like. The set of such devices may include devices that connect using a wired and/or wireless communications medium, such as personal computers, workstations, mobile devices, PDAs, and the like. Client device 104 may include a browser application that is configured to receive and render web pages, and the like. The browser application may be configured to receive and display graphics, text, multimedia, and the like, employing a markup language such as Hypertext Markup Language (HTML), and so forth. Client device 104 may further include a messaging client application, such as an IM client, an IRC client, a clipping service client, and the like, for sending and receiving messages to and from another device. The browser application, messaging client application, or another application running on client device 104 may enable client device 104 to select content, such as content received from web server 102, to be clipped, reformatted, and delivered to a remote device, such as remote devices 106-107, by way of clipping server 112.

Wireless network 110 is configured to couple remote devices 106-107 and their components with network 105. Wireless network 110 may include any of a variety of wireless sub-networks that may further overlay standalone ad hoc networks, and the like, to provide an infrastructure-oriented connection for remote devices 106-107. Such sub-networks may include mesh networks, wireless local area networks (WLANs), cellular networks, and the like. Wireless network 110 may further include an autonomous system of terminals, gateways, routers, and the like connected by wireless radio links, and the like. In some embodiments these connectors may be configured to move freely and randomly and organize themselves arbitrarily, such that the topology of wireless network 110 may change rapidly.

Wireless network 110 may further employ a plurality of access technologies including second (2G), third (3G), or fourth (4G) generation radio access for cellular systems, WLAN, Wireless Router (WR) mesh, and the like. Such access technologies may enable wide area coverage for mobile devices, such as remote devices 106-107, with varying degrees of mobility. For example, wireless network 110 may enable a radio connection through a radio network access such as Global System for Mobile communication (GSM), General Packet Radio Services (GPRS), Enhanced Data GSM Environment (EDGE), Wideband Code Division Multiple Access (WCDMA), and the like. In essence, wireless network 110 may include virtually any wireless communication mechanism by which information may travel between remote devices 106-107 and another computing device, a network.

Network 105 is configured to couple various computing devices to one another, including client device 104, web server 102, clipping server 112, and, through wireless network 110, remote devices 106-107, to enable such devices to engage in data communication. Network 105 is enabled to employ any form of medium for communicating information from one electronic device to another. Network 105 may include interconnected networks such as the Internet, wireless access networks, such as a cellular network, and/or wired networks and may include local area networks (LANs), wide area networks (WANs), direct connections, such as through a universal serial bus (USB) port, other kinds of network connections, or any combination thereof. On an interconnected set of LANs, including those based on differing architectures and protocols, a router typically acts as a link between LANs, enabling messages to be sent from one to another. Communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links, including satellite links, or other communications links known to those skilled in the art. Furthermore, remote computers and other related electronic devices may be remotely connected to either LANs or WANs by way of a modem and temporary telephone link. In essence, network 105 includes any communication method by which information may travel between computing devices. Network 105 is constructed for use with various wired and wireless communication protocols, such as TCP/IP, UDP, SIP, SMS, RTP, WAP, CDMA, TDMA, WCDMA, CDMA 2000, EDGE, UMTS, GSM, GPRS, UWB, WiMax, IEEE 802.11x, and the like.

Each of web server 102 and clipping server 112 may include any computing device capable of connecting to network 105. Web server 102 may generally include any computing device capable of connecting to network 105 to enable a user of client device 104 to browse content provided as web pages or the like. Clipping server 112 may include any computing device capable of connecting to network 105 to enable clipping service user 104 to clip content for delivery to a remote device. Devices that may operate as web server 102 or as clipping server 112 include server computers, personal computers, desktop computers, multiprocessor systems, and the like. Those skilled in the art will appreciate that other embodiments of the invention may include mechanisms other than a clipping server to forward content to mobile and/or non-mobile recipient devices, such as an IM server in which content may be sent to IM users as instant messages or attachments to instant messages.

Clipping Service Architecture

Figure 2:
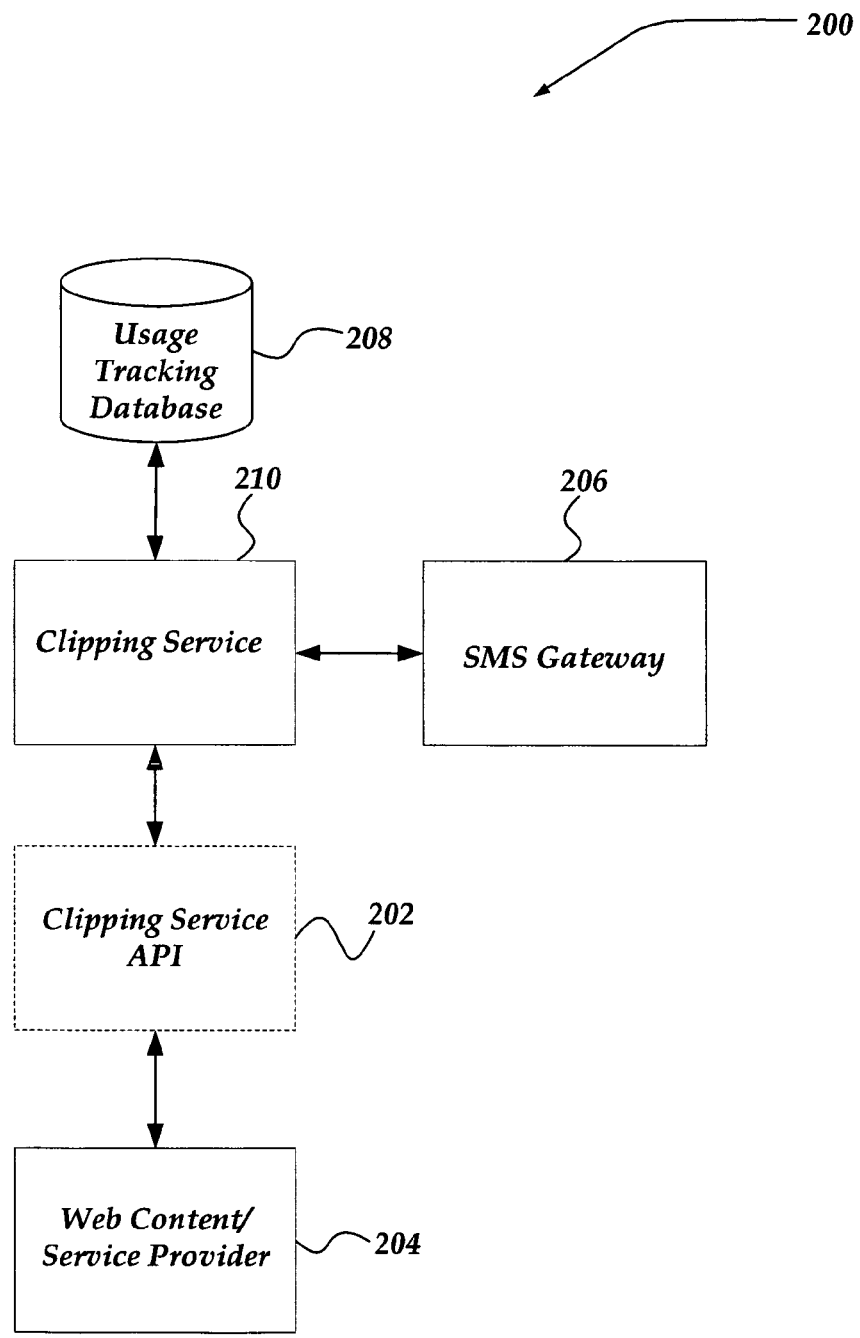
FIG. 2 shows a functional block diagram illustrating one embodiment of a clipping service architecture.

FIG. 2 shows one embodiment of a clipping service architecture. The components illustrated in FIG. 2 includes components that may be part of and/or connected to clipping server 112 to enable the operation of a content clipping service. The embodiment shown in FIG. 2 is one in which the clipping service is deployed to provide clipped content to mobile devices by way of SMS messages. However, many other embodiments are possible, including embodiments in which clipped content is provided to devices, including non-mobile devices, over wired networks, and embodiments in which clipped content is provided to mobile devices by way of other messaging technologies. Moreover, a clipping service may be provided as part of an IM service, or another kind of messaging or content delivery system.

As shown, clipping service architecture 200 includes interacting components, including clipping service 210, clipping service Application Programming Interface (API) 202, usage tracking database 208, SMS gateway 206, and web content/service provider 204. Web content/service provider 204 may be situated at web server 102. Web content provider 204, clipping service 210, clipping service API 202, usage tracking database 208, and SMS gateway 206 may be included as part of one device or a plurality of interconnected devices.

Web content/service provider 204 is configured to provide a request to forward clipped content to clipping service 210. Web content/service provider 204 may also specify one or more usage identities associated with the request for clipping service 210 to determine and store in usage tracking database 208. Web content/service provider 204 may also specify one or more thresholds to apply based on the specified usage identities.

Clipping server API 202 is one embodiment of a mechanism for enabling communication between clipping service 210 and web content/service provider 204. However, the invention is not limited to APIs, and virtually any other communication mechanism may be employed, without departing from the scope or spirit of the invention. For example, an messaging protocol may be employed, or a secure transfer communications link may be established, or the like.

In one embodiment, however, access to clipping service API 202 may be provided by way of web content/service provider 204. For example, a web page provided over a network by web content/service provider 204 to a client browser application may include components that enable content in the page to be selected for clipping and forwarding to a remote device by way of calls to functions exposed by clipping service API 202. Alternatively, the browser application, or another application, may provide a facility whereby a user may select content for clipping and forwarding to a remote device, in which access to clipping service API 202 may be provided directly to the user.

Clipping service 210 enables a remote clipping service user, such as clipping service user 104, to request a selected content item to be forwarded to an identified remote device. The remote recipient device may be identified, for example, by providing the cell phone number of the device, or another identifier.

In addition, clipping server 210 may be configured to also perform usage tracking. Clipping service 210 applies the specified thresholds, retrieving usage tracking information from usage tracking database 208, to determine whether the request to forward content is to be blocked, as is explained further above and below.

If clipping service 210 determines that a request to forward a clipped content item to a remote device will be allowed, the content item is formatted so that it may be viewed at the remote device, and an SMS message including the formatted content item, or a link to a network location at which the formatted item may be retrieved, is sent to the remote device by way of SMS gateway 206. However, the invention is not constrained to the use of SMS, and another messaging protocol may also be used, including instant messaging, MMS, or the like.

Illustrative Computing Device

Figure 3:
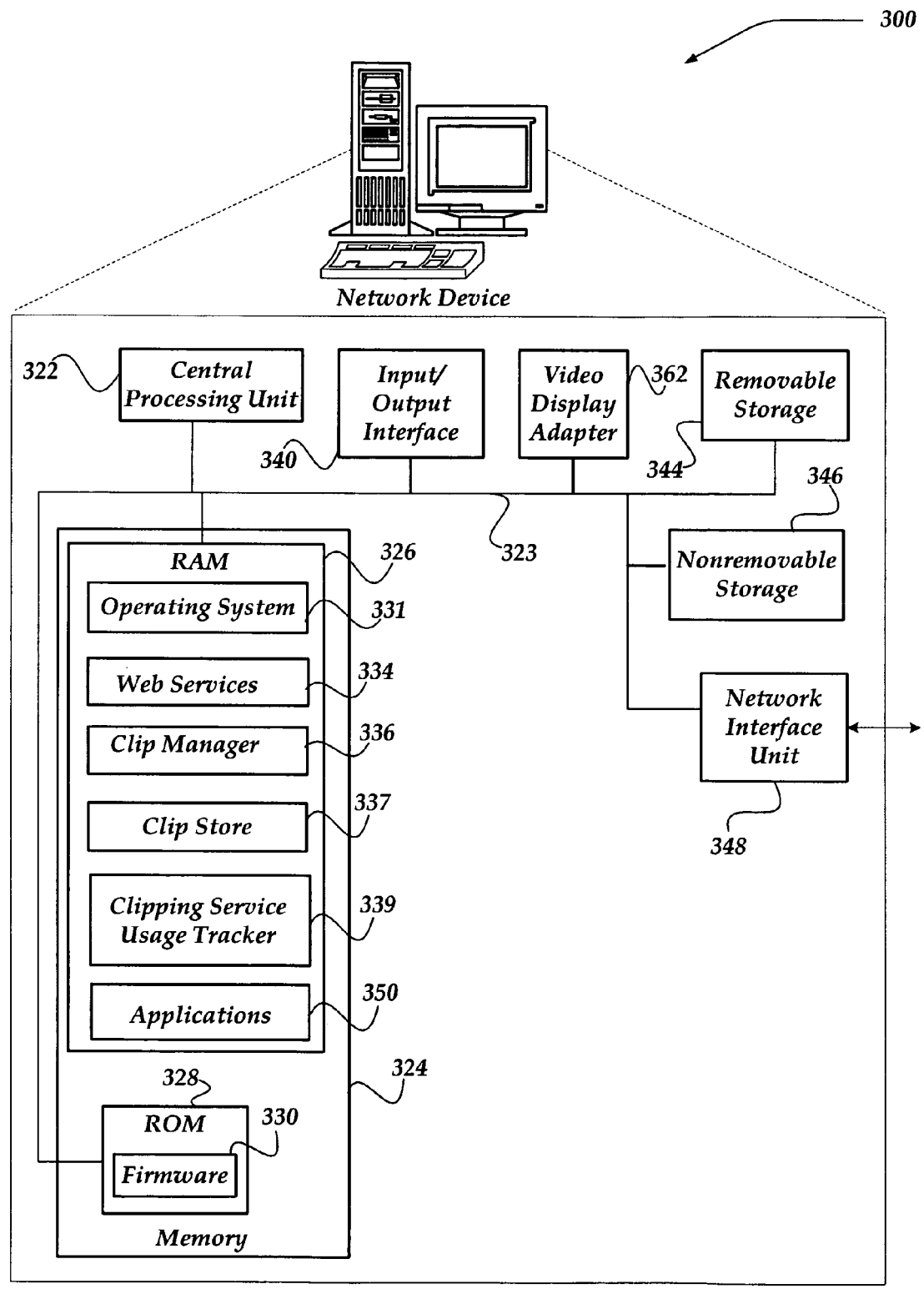
FIG. 3 shows one embodiment of a network device that may be employed for various purposes in a system implementing the invention.

FIG. 3 shows one embodiment of a network device. Device 300 may include many more components than those shown. The components shown, however, are sufficient to disclose an illustrative embodiment for practicing the invention. Device 300 may, for example, be employed to operate as clipping server 112 of FIG. 1. Device 300, and similar devices, may also be suitable to operate as one or more of the other network devices of FIG. 1, such as web server 102, client device 104, or one or more of remote devices 106-107.

Network device 300 includes central processing unit 322, input/output interface 340, video display adapter 362, main memory 324, removable secondary storage 344, nonremovable secondary storage 346, and network interface unit 348, all in communication with one another by way of bus 323. Main memory 324 generally includes RAM 326 and ROM 328, and may include other storage means, such as one or more levels of cache (not shown). Nonremovable storage 346 may include one or more nonvolatile mass storage devices, such as a hard disk, a tape drive, an optical drive. A hard disk is used by device 300 for storage of programs and data. Removable storage 344 may include a storage device such as a floppy disk drive. Main memory 324 stores operating system 331 for controlling the operation of device 300. A general-purpose or special-purpose operating system may be employed. Within ROM 328 may be stored firmware 330 for bootloading and controlling the low-level operation of device 300. Firmware 330 may include, for example, a Basic Input/Output System (BIOS). As illustrated in FIG. 3, device 300 can communicate with a network, such as network 105 or wireless network 110 of FIG. 1, by way of network interface unit 348, which is configured for use with various communication protocols such as TCP/IP, UDP/IP, and the like. Network interface unit 348 may include a transceiver, transceiving device, network interface card (NIC), and the like. Input/output interface 340 enables communication with external or peripheral input/output devices, such as a keyboard and a mouse.

Main memory 324, removable storage 344, and nonremovable storage 346 illustrate one type of processor-readable media, namely computer storage media. Computer storage media may include volatile, nonvolatile, removable, and non-removable media implemented by means of any method or technology for storage of information, such as computer-readable instructions, data structures, program modules, or other data. Examples of computer storage media include RAM, ROM, EEPROM, flash memory or other memory technology; CD-ROM, digital versatile disks (DVD) or other optical storage; magnetic cassettes, magnetic tape, magnetic disk storage, or other magnetic storage devices; or any other medium that can be used to store information and that can be accessed by a computing device.

Main memory 324 also stores program code and data. In addition to operating system 331, one or more applications 350 are loaded into RAM 326 and run by way of operating system 331. Examples of applications include web services 334, clip manager 336, clip store 337, and clipping service usage tracker 339.

Web services 334 are configured to manage requests from a browser application running on a client device and to deliver web-based content in response. In one embodiment, web services 334 interact with clip manager 336 to enable clipping of content that is provided to the client's browser for delivery to another computing device. In one embodiment, web services 334 may enable a clip icon, drop-down menu, pop-up menu, or similar clipping interface mechanism to allow a user to select content for delivery. Web services 334 may receive the clipping mechanism from clip manager 336. The clipping mechanism may further enable the user to provide an identifier that specifies a remote device to which the clipped content is to be delivered. For example, if the remote device is a cellular telephone, the identifier may include the cell phone number.

Clip manager 336 is configured to receive the clipped content from web services 334, along with the identifier of the destination remote device. Clip manager 336 may employ the identifier to determine a format that is compatible with the identified remote device, and, if necessary, clip manager 336 may reformat the clipped content into a compatible format. Clip manager 336 may further employ the identifier of the remote device to deliver the reformatted clipped content to the remote device. In one embodiment, clip manager 336 may send the reformatted clipped content to the remote device using any of a variety of message protocols, including SMS. In another embodiment, clip manager 336 may send a message to the remote device, for example by way of SMS, wherein the message includes or enables access to a URL that indicates a network location at which the clipped content may be obtained and displayed or rendered by way of a browser application running on the remote device, or by way of another appropriate application.

Clipping service usage tracker 339 determines, stores, and retrieves, for example by way of a database, one or more usage identities of a clipped content item and/or associated thresholds. Usage identities may include one or more of a source identity, a content identity, and a destination identity, as explained further above and below. Clip manager 336 determines whether a request to forward a content item will be allowed by applying one or more thresholds. Each applied threshold is a limit on a number of clipped content items associated with a particular usage identity that may be delivered to remote devices within a time period. For a given kind of content item, the applicable threshold or thresholds may be specified by the web server or other provider of the content, or they may be in accordance with default policies, and the like.

Clip store 337 makes use of a storage mechanism, including a file, database, or the like, to store and manage clipped content. The clipped content may be organized by clip store 337 using one or more of the source, content, and destination identities determined and stored by clipping service usage tracker 339.

Although illustrated in FIG. 3 as distinct components, web services 334, clip manager 336, clip store 337, and clipping service usage tracker 339 may be arranged, combined, and the like, in any of a variety of ways, without departing from the scope of the present invention. Moreover, web services 334, clip manager 336, clip store 337, and clipping service usage tracker 339 may reside in one or more separate computing devices, substantially similar to device 300.

Generalized Operation

Figure 4:
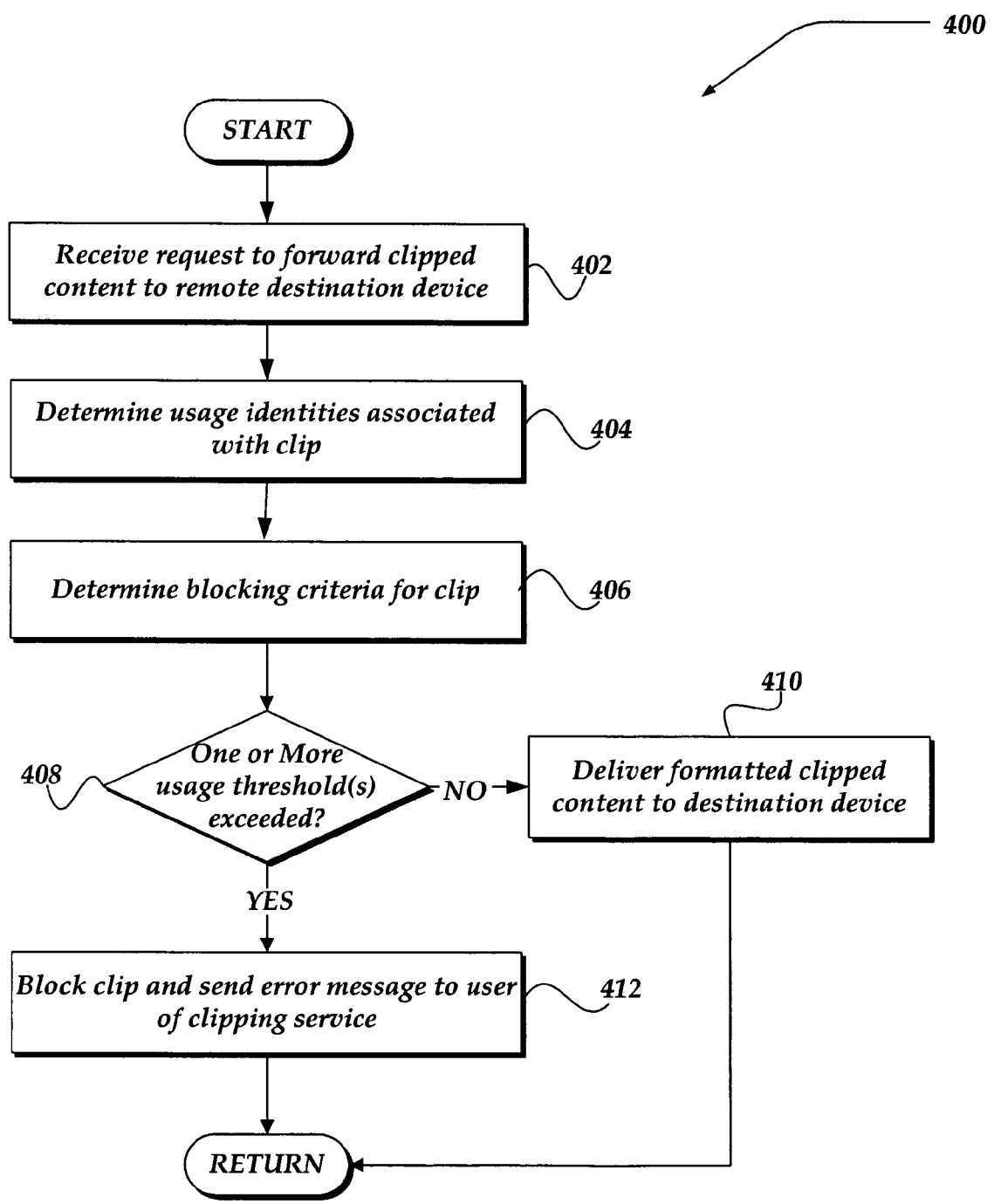
FIG. 4 illustrates a logical flow diagram generally showing one embodiment of a process for tracking and blocking clipped content requested for forwarding to a remote device.

The operation of certain aspects of the present invention will now be described with respect to FIGS. 4-7. FIG. 4 illustrates a logical flow diagram generally showing one embodiment of a process for tracking and blocking clipped content requested for forwarding to a remote device. Process 400 of FIG. 4 may, for example, be performed by a device such as clipping server 112.

Process 400 begins, after a start block, at block 402, where an item of clipped content is received with a request to forward the content item to a remote destination device. The request is made by another remote device, either directly or by way of a content provider, such as web server 102, that enables clipping of content, for example through a web-based interface.

Processing then flows to block 404, at which usage identities associated with the clip are determined. Depending, for example, on the configuration of clipping server 112, one or more of a source identity, a content identity, and a destination identity may be determined. The particular usage identities to determine may be specified by the web content/service provider. In one embodiment, default usage identity categories may be determined.

Process 400 continues to block 406, where blocking criteria, including one or more applicable thresholds associated with the usage identities may be determined for the clipped content. In one embodiment, the content provider, such as web server 102, may also specify one or more blocking criteria. In one embodiment, default thresholds may be applied.

Processing next flows to decision block 408, where a determination is made regarding whether the applicable usage thresholds have been exceeded. If more than one threshold is applicable, depending on the blocking criteria, a clipped content item may be determined to be blocked from delivery if one or more of the thresholds is exceeded. Thus, at decision block 408, a determination may be based on a destination threshold, a source threshold, a content threshold, or any combination of two or more of the destination threshold, source threshold, or content threshold.

Thus, if, at decision block 408, a specified minimum number of applicable thresholds are determined not to be exceeded, process 400 branches to block 410, where a message that includes the clipped content, or a message containing a link to the clipped content, is delivered to the remote destination device as requested. In addition, at block 410, tracking records of the different identities may also be updated. Processing then returns to a calling process to perform other actions.

If the requisite number of usage thresholds is determined to be exceeded, however, at decision block 408, processing flows to block 412, where the clipped content is blocked from forwarding. In one embodiment, an error message may also be sent to the end user of the clipping service. Process 400 then returns to a calling process to perform other actions.

FIG. 4 above illustrates determining usage identities for one or more source, destination, and/or content identities, and one or more associated thresholds. Thus, as described above, one or more of the thresholds may be examined for a given clipped content, based, in part, on directions from the web content/service provider, or another mechanism.

Figure 5:
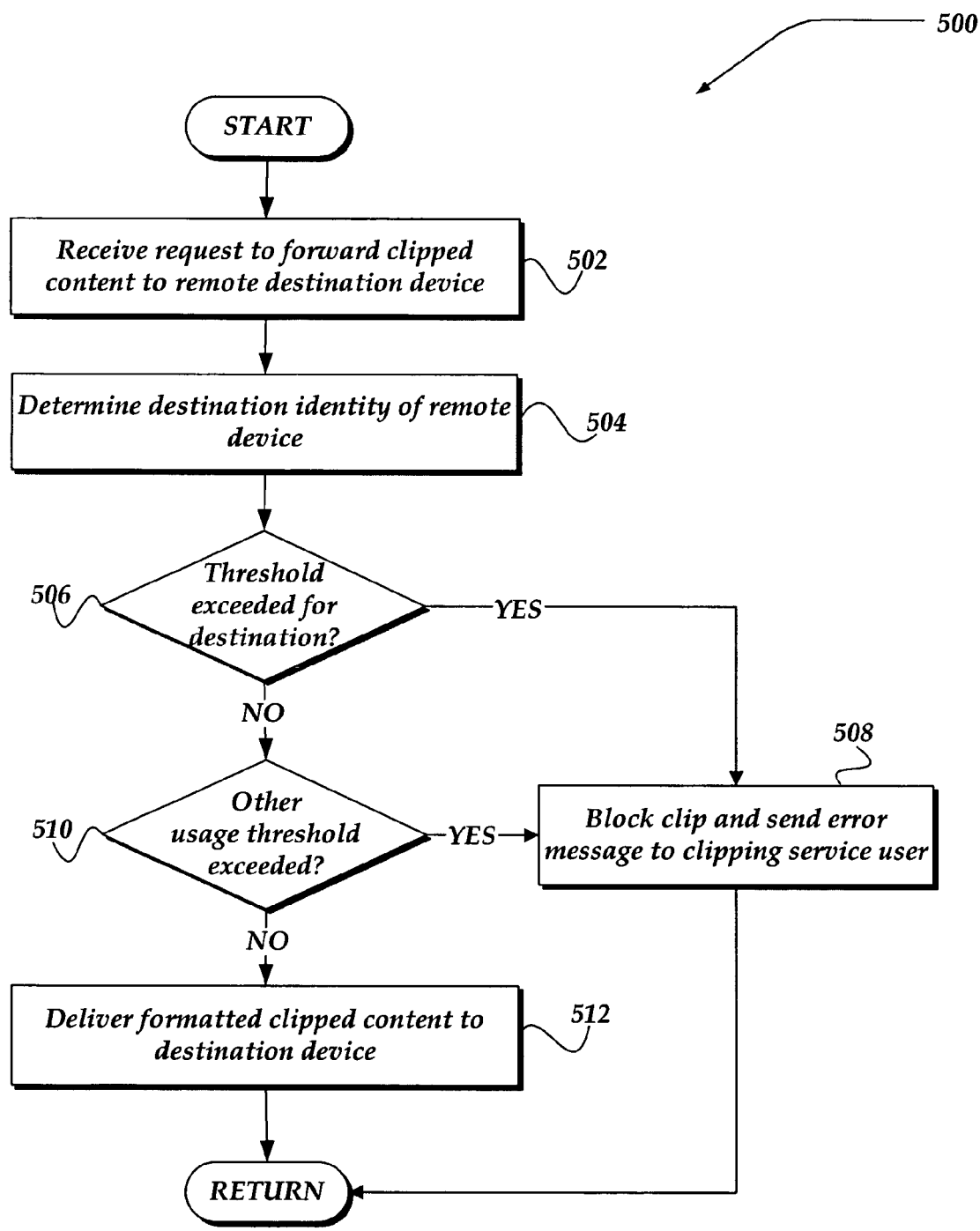
FIG. 5 illustrates a logical flow diagram generally showing one embodiment of a process for tracking and blocking clipped content requested for forwarding to a remote device, in which a threshold associated with a destination usage identity is applied.
Figure 6:
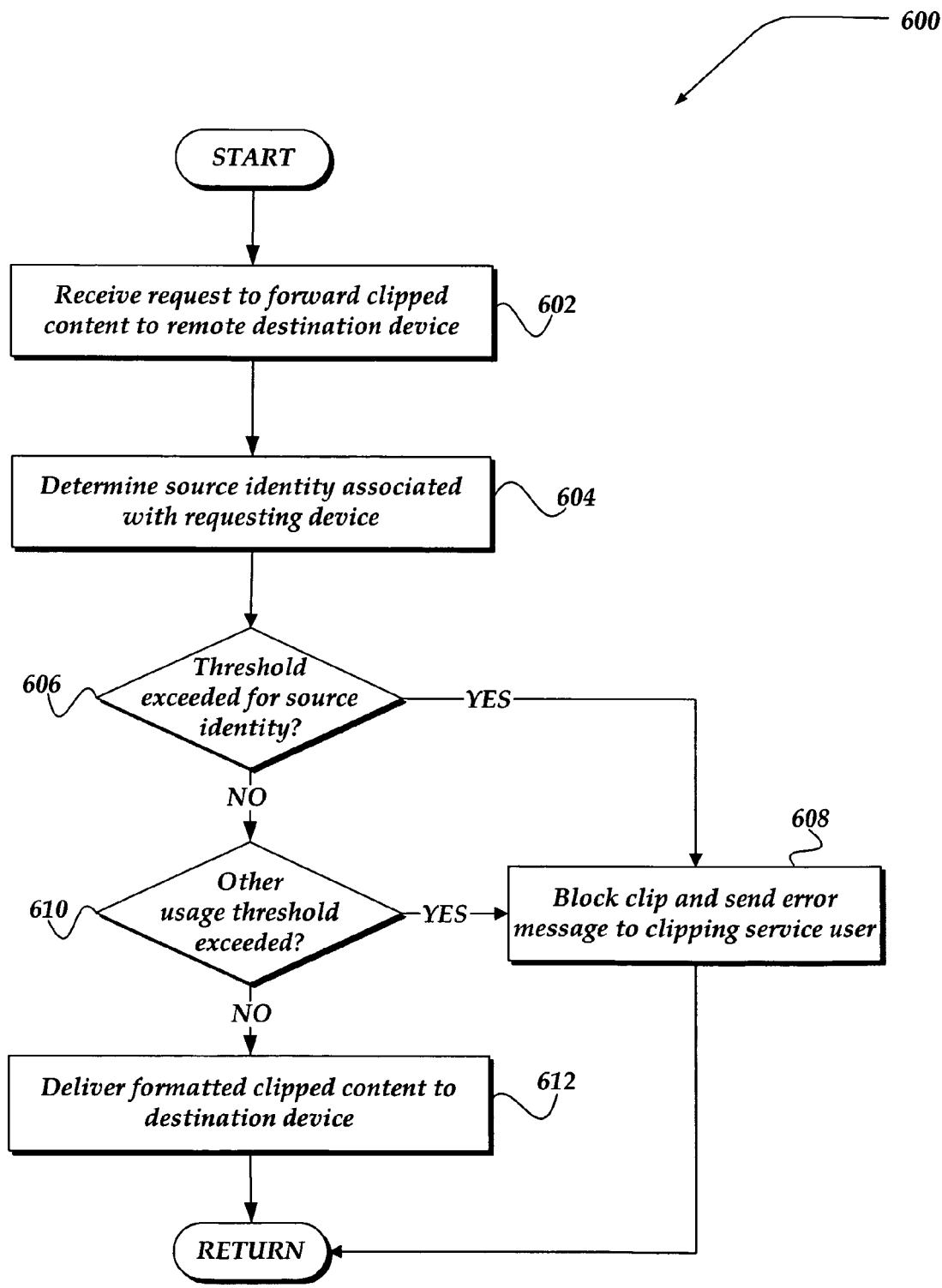
FIG. 6 illustrates a logical flow diagram generally showing one embodiment of a process for tracking and blocking clipped content requested for forwarding to a remote device, in which a threshold associated with a source usage identity is applied.
Figure 7:
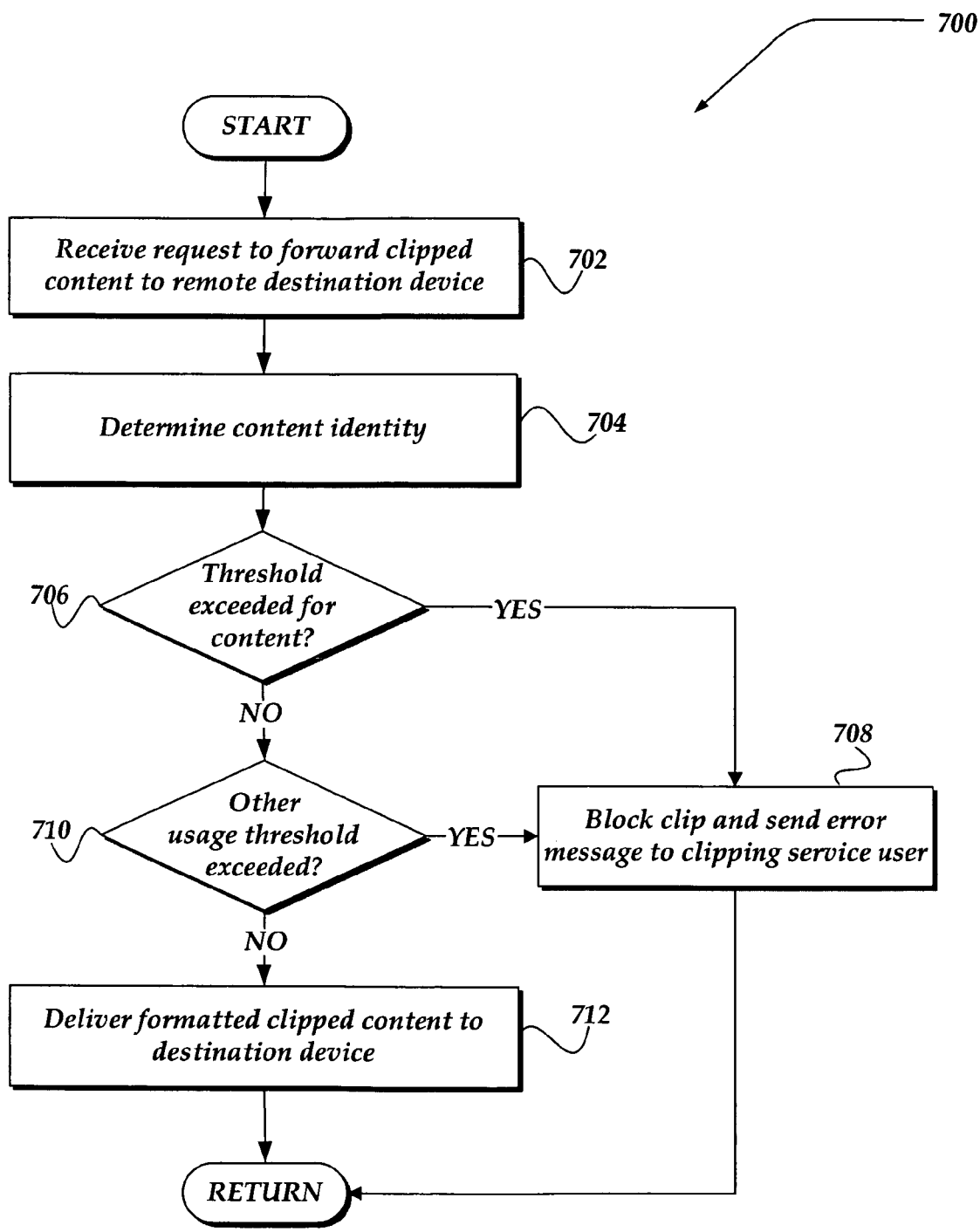
FIG. 7 illustrates a logical flow diagram generally showing one embodiment of a process for tracking and blocking clipped content requested for forwarding to a remote device, in which a threshold associated with a content usage identity is applied, in accordance with the present invention.

However, to further illustrate the invention, FIGS. 5-7 provide possible variations on FIG. 4. For example, FIG. 5 illustrates monitoring destination identities, while FIG. 6 illustrates monitoring source identities, and FIG. 7 illustrates monitoring content identities.

FIG. 5 illustrates a logical flow diagram generally showing one embodiment of a process for tracking and blocking clipped content requested for forwarding to a remote device, in which a threshold associated with a destination usage identity is applied. Process 500 begins, after a start block, at block 502, at which a request to forward clipped content to a remote device is received. At block 504, a destination identity of the remote device is determined. The destination identity is included as part of the forwarding request. For example, if the remote device is a cell phone, or the like, the destination identity may include the cell phone number. For other kinds of remote devices, the destination identity may include other kinds of network addresses or locations. For example, if the content clipping service is provided in association with an IM system, the destination identity may include the IM account name of the recipient.

Processing continues at decision block 506, where it is determined whether an applicable destination identity threshold has been exceeded with respect to the determined destination identity. For example, for content items of a given type, a policy may be in place to limit the number of clipped content items forwarded to a particular cell phone number within a 24-hour period. If the destination identity threshold is exceeded, processing flows to block 508, where the clipping forwarding request is blocked and an error message is sent to the requesting device. Process 500 then returns to a calling process to perform other actions.

If the destination identity threshold is not exceeded, however, process 500 flows to decision block 510, at which it is determined whether other applicable usage thresholds have been exceeded. If so, processing branches to block 508, where the clipping forwarding request is blocked and an error message is sent to the requesting device. Process 500 then returns to a calling process to perform other actions. If, however, no other applicable thresholds are exceeded, process 500 flows to block 512, at which the clipped content, or a message containing a link to the clipped content, is delivered to the destination device. In addition, at block 512, tracking records of the destination identity may also be updated. Process 500 then returns to a calling process to perform other actions.

FIG. 6 illustrates a logical flow diagram generally showing one embodiment of a process for tracking and blocking clipped content requested for forwarding to a remote device, in which a threshold associated with a source usage identity is applied. Process 600 begins, after a start block, at block 602, at which a request to forward clipped content to a remote device is received. At block 604, one or more kinds of source identities for the clipping request are determined.

Examples of source identities that may be employed include an anonymous user cookie, a logged-in or authenticated user cookie, another kind of cookie mechanism, a determined Internet Protocol (IP) address of the remote requesting device, a staged cookie, or an issued certificate identifying the user making the forwarding request. A staged cookie is a mechanism for tracking user navigations, and may indicate a level of trust associated with the user. For example, in one embodiment, staged cookies may be employed to indicated that a provider of the staged cookie is trustable as a person, end-user, or the like, rather than being an automated process, such as might be employed to provide spam messages, or the like. A combination of two or more kinds of source identities may also be determined for the content forwarding request. The choice of the kind or kinds of source identities to track for a given kind of content item may reflect, for example, concerns regarding security or the degree to which the requesting user may easily be identified. For example, an available logged-in user cookie may be sufficient as a source identity for a clipping of a webmail content item. By contrast, in the case of an application that permits clipping of content of any type, and modification of the content by the user, and for which no associated cookie is available, a certificate that identifies the application user may be desirable. For other kinds of content items or clipping applications, a combination of source identities, such as a combination of an anonymous user cookie, a source IP address, and a staged cookie, may be appropriate.

Process 600 continues at decision block 606, where a determination is made whether a source identity threshold is exceeded with respect to a particular source identity, or combination of source identities, that have been determined for the clipping request. If the source identity threshold is exceeded, processing flows to block 608, where the clipping forwarding request is blocked and an error message is sent to the requesting device. Process 600 then returns to a calling process to perform other actions.

If the tested source identity threshold is not exceeded, however, process 600 flows to decision block 610, at which it is determined whether other applicable usage thresholds have been exceeded. If so, processing branches to block 608, where the clipping forwarding request is blocked and an error message is sent to the requesting device. Process 600 then returns to a calling process to perform other actions. If, however, no other applicable thresholds are exceeded, process 600 flows to block 612, at which the clipped content, or a message containing a link to the clipped content, is delivered to the destination device. In addition, at block 612, tracking records of the source identity may also be updated. Process 600 then returns to a calling process to perform other actions.

FIG. 7 illustrates a logical flow diagram generally showing one embodiment of a process for tracking and blocking clipped content requested for forwarding to a remote device, in which a threshold associated with a content usage identity is applied. Process 700 begins, after a start block, at block 702, at which a request to forward clipped content to a remote device is received. At block 704, a content identity for the clipping request is determined.

The content identity is based on the content of the clipped item itself. For example, the clipped item may be textual information clipped from a website, such as a business address or a news article. In one embodiment, the clipped content is obtained from the web content/service provider. The text is hashed into a key. The applicable content threshold is a limit on the number of messages sent out for which the clipped content is associated with that hash key. In one embodiment, determination of the content identity may be performed by the web content/service provider. Where the content may be generated by the end user, a content identity may be more strict, including information associated with the end user, for example, as well as other information, about the content, or the like.

Process 700 continues at decision block 706, where a determination is made whether a content identity threshold is exceeded with respect to the determined content identity. If the content identity threshold is exceeded, processing flows to block 708, where the clipping forwarding request is blocked and an error message is sent to the requesting device. Process 700 then returns to a calling process to perform other actions.

If the content identity threshold is not exceeded, however, process 700 flows to decision block 710, at which it is determined whether other applicable usage thresholds have been exceeded. If so, processing branches to block 708, where the clipping forwarding request is blocked and an error message is sent to the requesting device. Process 700 then returns to a calling process to perform other actions. If, however, no other applicable thresholds are exceeded, process 700 flows to block 712, at which the clipped content, or a message containing a link to the clipped content, is delivered to the destination device. In addition, at block 710, tracking records of the content identity may also be updated. Process 700 then returns to a calling process to perform other actions.

It will be appreciated that the second decision block shown in each of the flow diagrams of FIGS. 5-7 is not necessary if the only applicable threshold is the usage identity threshold tested at the first decision block. It will also be appreciated that an applicable threshold may be based on more than one determined source identities.

It will be understood that each block of the flow diagrams discussed above, and combinations of blocks in the flow diagrams, can be implemented by computer program instructions. These program instructions may be provided to a processor to produce a machine, such that the instructions, executing on the processor, create means for implementing the actions specified in the flow diagram block or blocks. Accordingly, blocks of the flow diagrams support combinations of means for performing the specified actions, including program instruction means. It will also be understood that each block of the flow diagram illustrations, and combinations of blocks in the flow diagrams, can be implemented by special-purpose hardware-based systems that perform the specified actions, or by combinations of special-purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A method for regulating transmission of content over a network, comprising:
   receiving a request from a first remote device to enable a content item selected at the first remote device to be provided to a second remote device;
   if the content item is determined to be generated by a user of the first remote device, then generating a content identity for the content item as a hash of a combination of text in the content item and information about the user;
   else if the content item is determined to not be generated by the user, generating the content identity as a hash of the text in the content item;
   determining whether providing the same content item exceeds a threshold for a number of messages sent over the network based on the content identity; and
   if providing the content item exceeds the threshold, preventing the content item from being provided to the second remote device.

2. The method of claim 1, wherein the second remote device is at least one of a mobile device, a mobile telephone, a pager, a personal digital assistant, a personal computer, or a wireless network node.

3. The method of claim 1, wherein enabling the content item to be provided to the second remote device comprises providing a message to the second remote device, wherein the message includes a reference to a network location at which a formatted version of the content item is retrievable.

4. A computer readable storage medium that is configured to store program instructions that when loaded onto a computer perform the method of claim 1.

5. The method of claim 1, wherein the content item is content that is clipped from a website.

6. The method of claim 1, further comprising:
   determining whether providing the content item exceeds another threshold for a number of times the content item is sent to a particular destination identity, wherein the destination identity includes at least one of a mobile telephone number, an instant messaging address, or a network address of the second remote device.

7. The method of claim 1, further comprising:
   determining whether providing the content item exceeds another threshold for a number of times the content item is sent by a particular source identity, wherein the source identity includes at least one of a cookie, an anonymous user cookie, an authenticated user cookie, a staged cookie, an Internet Protocol (IP) address, a certificate, or a network address of the first remote device.

8. An apparatus usable to manage content over a network, comprising:
   a transceiver for receiving and for sending information over the network; and
   program code that is operative to perform actions comprising:
      receiving a request from a first remote device to enable a content item selected at the first remote device to be provided to a second remote device;
      if the content item is determined to be generated by a user of the first remote device, then generating a content identity for the content item as a hash of a combination of text in the content item and information about the user;
      else if the content item is determined to not be generated by the user, generating the content identity as a hash of the text in the content item;
      determining if providing the same content item is within a threshold associated with a number of times the same content item is sent to a particular destination identity within a defined time period based in part on the content identity; and
      if providing the content item over the network is within the threshold, enabling the content item to be provided to the second remote device.

9. The apparatus of claim 8, the actions further comprising:
   if providing the content item over the network exceeds the threshold, preventing the content item from being provided to the second remote device.

10. The apparatus of claim 8, wherein if providing the content item over the network exceeds the threshold, further comprising: sending an error message.

11. The apparatus of claim 8, wherein the content item includes content clipped from information at a network device.

12. A server for regulating transmission of content over a network, comprising:
    a network interface;
    a processor in communication with the network interface; and
    a memory in communication with the processor for storing machine instructions that enable actions, including:
       receiving a request from a first remote device to enable a content item selected at the first remote device to be provided to a second remote device;
       if the content item is determined to be generated by a source identity of the first remote device, then generating a content identity for the content item as a hash of a combination of text in the content item and information about the source identity;
       else if the content item is determined to not be generated by the source identity sending the request, generating the content identity as a hash of the text in the content item;
       determining whether providing the content item exceeds a first threshold associated with a number of times the same content item is sent over the network for which the content item is associated with the content identity, or further
       exceeds a second threshold associated with a number of times the same content item is sent over the network within another defined time period to a particular destination identity; and
       if providing the content item exceeds the first threshold or the second threshold, preventing the content item from being provided to the second remote device.

13. The server of claim 12, wherein enabling the content item to be provided to the second remote device comprises providing a message to the second remote device, wherein the message includes a reference to a network location at which a formatted version of the content item is retrievable.

14. The server of claim 12, wherein enabling the content item to be provided to the second remote device includes employing at least one of a clipping service, text messaging, Short Message Service (SMS), Multimedia Message Service (MMS), Smart Messaging, Over the Air (OTA) messaging, instant messaging (IM), internet relay chat (IRC), Jabber, Wireless Application Protocol (WAP), iMode, or Hypertext Transfer Protocol (HTTP).

15. The server of claim 12, wherein the destination identity includes at least one of a mobile telephone number, an instant messaging address, or a network address of the second remote device.

16. The server of claim 12, wherein the source identity includes at least one of a cookie, an anonymous user cookie, an authenticated user cookie, a staged cookie, an Internet Protocol (IP) address, a user certificate, or a network address of the first remote device.

17. The server of claim 12, wherein determining whether providing the content item exceeds the first and second thresholds further comprises employing a database for tracking usage of a content clipping service.

18. A client configured to manage content over a network, comprising:
   a network interface;
   a processor in communication with the network interface; and
   a memory in communication with the processor useable in storing machine instructions that enables actions, including:
      providing a request to enable a selected content item to be provided to a remote device;
      if the content item is determined to be generated by a user of the first remote device, then generating a content identity for the content item as a hash of a combination of text in the content item and information about the user;
      else if the content item is determined to not be generated by the user, generating the content identity as a hash of the text in the content item;
      determining if providing the same content item is within a threshold associated with a number of times the same content item is sent to a particular destination identity within a defined time period based in part on the content identity; and
      if providing the content item is within the threshold, enabling the content item to be provided to the remote device.

19. The client of claim 18, wherein the remote device is at least one of a mobile device, a mobile telephone, a pager, a personal digital assistant, a handheld computer, or a stationary wireless node.

20. The client of claim 18, wherein enabling the content item to be provided to the remote device comprises enabling a message to be provided to the remote device, wherein the message includes a reference to a network location at which a formatted version of the content item is retrievable.

21. The client of claim 18, wherein enabling the content item to be provided to the remote device includes employing at least one of a clipping service, text messaging, Short Message Service (SMS), Multimedia Message Service (MMS), Smart Messaging, Over the Air (OTA) messaging, instant messaging (IM), internet relay chat (IRC), Jabber, Wireless Application Protocol (WAP), iMode, or Hypertext Transfer Protocol (HTTP).

22. The client of claim 18, wherein the destination identity includes at least one of a mobile telephone number, an instant messaging address, or a network address of the second remote device.

23. The client of claim 18, wherein the user is associated with a source identity that includes at least one of a cookie, an anonymous user cookie, an authenticated user cookie, a staged cookie, an Internet Protocol (IP) address, a user certificate, or a network address of the first remote device.

24. A processor-readable storage medium having instructions thereon that when the instructions are executed by a network device enable regulation of content transmission over a network, comprising:
   receiving a request from a first remote device to enable a content item selected at the first remote device to be provided to a second remote device;
   if the content item is determined to be generated by a user of the first remote device, then generating a content identity for the content item as a hash of a combination of text in the content item and information about the user;
   else if the content item is determined to not be generated by the user, generating the content identity as a hash of the text in the content item;
   determining if providing the same content item is within a threshold associated with a number of times the same content item is sent to a particular destination identity within a defined time period based in part on the content identity; and
   if providing the content item exceeds the threshold, preventing the content item from being provided to the second remote device.

* * * * *